B. H. CHRISTLIEB.
LUGGAGE AND BAGGAGE CARRYING APPARATUS.
APPLICATION FILED APR. 19, 1919.

1,406,539.

Patented Feb. 14, 1922.

Witness:
W. M. Gentle.

Inventor.
Benjamin Henry Christlieb.
by
James R. Townsend
his Atty

B. H. CHRISTLIEB.
LUGGAGE AND BAGGAGE CARRYING APPARATUS.
APPLICATION FILED APR. 19, 1919.
1,406,539.
Patented Feb. 14, 1922.
2 SHEETS—SHEET 2.
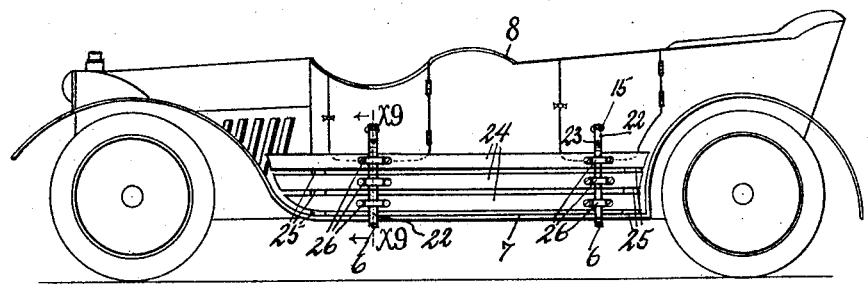
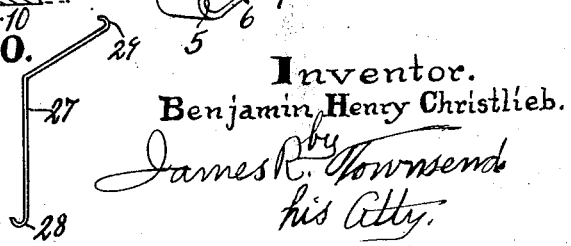
Witness:
W. M. Gaulle
Inventor.
Benjamin Henry Christlieb.
James R. Townsend
his Atty.

UNITED STATES PATENT OFFICE.

BENJAMIN HENRY CHRISTLIEB, OF FULLERTON, CALIFORNIA.

LUGGAGE AND BAGGAGE CARRYING APPARATUS.

1,406,539.  Specification of Letters Patent.  Patented Feb. 14, 1922.

Application filed April 19, 1919. Serial No. 291,360.

*To all whom it may concern:*

Be it known that I, BENJAMIN HENRY CHRISTLIEB, a citizen of the United States, residing at Fullerton, in the county of Orange and State of California, have invented a new and useful Luggage and Baggage Carrying Apparatus, of which the following is a specification.

This invention relates to apparatus for the transportation of luggage or baggage on automobiles, and consists of the new and useful features and improved construction, combination and arrangement of parts the purpose of which will be apparent to those skilled in the art, from a consideration of the preferred form of construction herein shown.

The principal object of this invention is to provide an apparatus for the carriage of luggage and baggage that will be simple in construction, effective in operation, inexpensive to manufacture and which may be attached easily and quickly to, and detached easily and quickly from, an automobile.

Another object of this invention is to provide a luggage and baggage carrying apparatus which may be attached to, or detached from, an automobile without marring or defacing any part thereof; and which carrier when attached to the running-board of the vehicle is held out of contact with other parts of the automobile thereby avoiding defacing contact therewith.

Another object of this invention is to provide a luggage and baggage carrying apparatus which may be adapted to hold various kinds of luggage.

Another object of this invention is to provide the luggage and baggage carrying apparatus with attachments whereby a compartment the full length of the running-board of the automobile may be formed.

Other objects, advantages and features of invention will appear from the accompanying drawings, the subjoined detail description and the appended claims.

The drawings illustrate the invention.

Fig. 3 is a section taken on the line $x^3$—$x^3$ of Fig. 1, parts being broken away and parts omitted.

Fig. 4 is a perspective view of the standard and base plate and the links thereon detached from the running-board of the automobile; also showing by dotted line a strap attached thereto.

Fig. 5 is a section taken on the line $x^5$—$x^5$ of Fig. 3 showing a detail of the link on the standard.

Fig. 6 is another view of the apparatus similar to the view in Fig. 1 showing attachments thereto whereby a compartment is formed on the running-board of the automobile.

Fig. 7 is an enlarged view of one of the attachments shown in Fig. 6, the attachment being shown in elevation.

Fig. 8 is an edge view of what is shown in Fig. 7.

Fig. 9 is a section taken on the line $x^9$—$x^9$ of Fig. 6.

Fig. 10 is an edge view of a spacing bar used in conjunction with the attachment shown in Figs. 7 and 8.

Fig. 11 is a modified form of the apparatus; showing it as constructed for carrying kegs, barrels or luggage of like nature.

Figure 1:
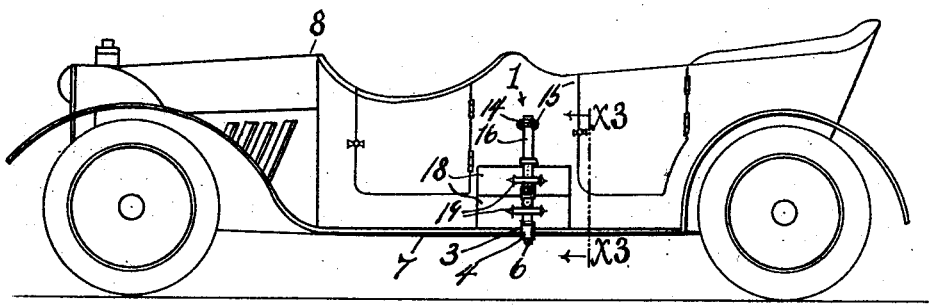
Figure 1 is a side elevation of the apparatus attached to the running-board of an automobile; with two suit cases secured thereon.
Figure 2:
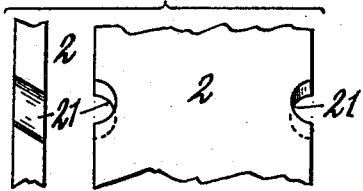
Fig. 2 is a side and edge view of a portion of the standard showing the inclined notches in the edges thereof, parts being broken away.
Figure 2:
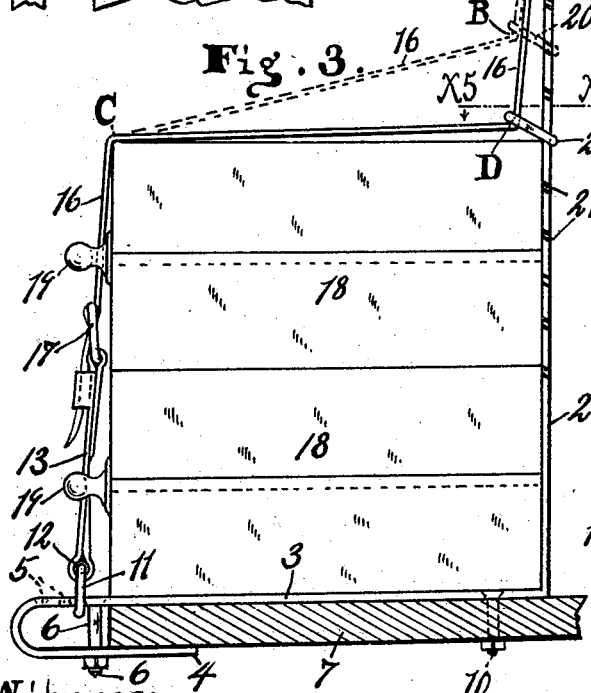

In detail, the luggage and baggage carrying apparatus 1 consists of the standard 2 the bottom end of which is integral with one end of the base plate 3.

The base plate 3 lies at right angles to the standard 2 and has its loose end turned downward and under said plate to form the clamping jaw 4.

Through the plate 3 and jaw 4 there are the holes 5 in which the bolt 6 is secured when the apparatus is clamped to the running-board 7 of the automobile 8; and as shown in Figs. 3 and 9 the bolt 6 does not pass through the running-board 7 but is brought up near to the outer edge thereof so that when the nut is tightened on said bolt the plate 3 will be securely clamped to the running-board without marring or defacing it; and in ordinary traveling the foregoing means is sufficient to hold the apparatus and the baggage attached thereto in place.

In the event that heavier travel is contemplated and it is desirous to more rigidly secure the baggage carrying apparatus to the running-board of the automobile a small hole 9 is drilled through the rear portion of the plate 3 and the running-board 7 and a bolt 10 secured therein; by which means the carrying apparatus is held firmly in place.

Within the loop formed by the connection of the jaw 4 to the plate 3 there is loosely mounted the link 11 which preferably is provided with the roller 12, and to this roller is secured one end of the strap 13.

The upper end of the standard 2 is enlarged and has therein the transverse slot 14, so that a ring flange 15 is thus formed on the end of said standard.

To the ring flange 15 there is secured one end of the strap 16 which latter is adapted to pass through the buckle 17 on the loose end of the strap 13, and to be tightened to hold in place the luggage or baggage which is to be carried.

When suit cases 18 are to be carried, the straps 13 and 16 are passed between the handles 19, as shown in Figs. 1 and 3, and buckled together.

As is well known it is impossible to buckle straps together without there being a slight slacking of the straps when the tongue is moved into place and the pull on said straps is released; as is also well known this slackage is sufficient to give the luggage some play or shifting movement in rough travel and this shifting eventually loosens or mars the luggage; consequently in this apparatus a means is provided for taking up this slack in the straps and hold the luggage securely in place.

For this purpose there is movably mounted on the standard 2 the strap-tightening link 20 which latter, when moved from the dotted to the full lined position shown in Fig. 3 removes the slack from the straps and secures the luggage in place.

The standard 2 is provided with paired notches 21 in the edges thereof which notches are inclined upwardly from the rear forwardly so that when the link 20 is secured in any of these notches the link will incline upwardly as seen in the drawings; and also the link will be locked against either upward or downward movement when in this position.

In other words, the link 20 is narrower at its rear end than the standard; and the distance between its sides at the rear end is substantially the distance between the inner edges of said pair of notches so that when the sides of said link are in said notches the link cannot be moved up or down on said standard.

The forward portion of the link 20 is enlarged so that it can freely pass along the standard; consequently when the link is to be moved either up or down on said standard it is first moved rearwardly to bring the enlarged portion in register with said standard.

From the foregoing it may easily be seen that by moving the link 20 from the dotted to full line position in Fig. 3 the straps will be tightened as the distance A, B, C is considerably less than the distance A, D, C; consequently the straps will have to accommodate themselves to the increased distance; thereby tightly securing the suit cases 18 in place.

As seen by dotted lines in Fig. 4 a single strap 22 may be used; one end of which passes down through the link 20 and around the roller 12 and has thereon the buckle 23. The other end of said strap passes through the slot 14 and over the ring flange 15 and extends down and is attached to the buckle 23; and the slack in this strap is taken up in the same way as that heretofore described.

When a luggage carrying compartment is to be formed the full length of the running-board of the automobile, two of the carrying apparatuses 1 are secured to the front and rear of said board as shown in Fig. 6 and to these are attached the sideboards 24.

The boards 24 are provided with the spacing blocks 25; and also secured to said boards are the straps 26 so positioned that they are in central alinement with the standard 2 of said carrier 1.

A spacing bar 27 is bent to form an obtuse angle and has its ends 28 and 29 turned outwardly from said angle forming hooks which are adapted to engage the link 11 and the ring flange 15 forming thereby a support for the boards 24.

There is one of these bars 27 for each of the supports 1; and as shown in Fig. 9 these bars pass through the straps 26 of the boards 24; and also passing through these straps is a portion of the strap 22 which latter passes through the link 20 and also through the link 11 and through the slot 14 and is secured by the buckle 23.

From the foregoing it may readily be seen that the strap 22 in addition to securing the boards 24 to the bar 27 binds the hooked ends 28 and 29 of the bar to the link 11 and the ring flange 15; so that when these parts are in place and the link 20 is moved down on the standard 2 to remove the slack from the strap 22 a substantial and rigid fence will be formed at the outer edge of the running-board 7, and between said fence and the automobile is thus formed a spacious compartment 30.

In the modification shown in Fig. 11 the base plate 3 is provided with arms 31 and 32 which at their inner ends are integral with the base plate; and the outer ends of these arms are enlarged and slotted to form the ring flanges 33 and 34 respectively.

To the flange 33 is attached one end of a strap 35, and to the flange 34 is attached one end of another strap 36, and the strap 36 is provided with a buckle 37 by which the straps are secured together; and as shown in Fig. 11, a barrel 38 is indicated by dotted line and shown as secured to the base plate and standard by the aforementioned straps.

I claim:

1. In a baggage carrier, a base plate secured to the running-board of an automobile, a standard on said base plate, a ring flange on said standard, a link on said base plate, a strap connection between said link and said ring flange, a link mounted on said standard and being slidable over the standard and over the strap; and means for holding said last mentioned link in locked engagement at various heights of said standard for tightening the strap.

2. In a baggage carrier, a base plate secured to the running-board of an automobile, a standard secured to said base plate and having a plurality of inclined notches, a ring flange on the upper end of said standard, a link on said base plate, a strap connection between said link and said ring flange; and a link mounted on said standard and being slidable over the standard and over the strap for tightening the strap, said last mentioned link being held in locked engagement with the inclined notches of said standard by the tension of the strap.

3. In a luggage carrier, a base plate secured to the running-board of an automobile, a standard secured to said base plate, a ring flange on the upper end of said standard, a link secured to said base plate, a strap connection between said link and said ring flange, a link on said standard for tightening said strap, and notches in said standard for securing said last mentioned link.

4. In a baggage carrier, a base plate secured to an automobile, a standard secured to said base plate, a ring flange on the upper end of said standard, a link mounted on the base plate, a strap connecting said link and said ring flange, another link on said standard for tightening said strap, and a plurality of inclined notches in said standard and means whereby said last mentioned link is secured in any of said notches by the tension of the strap.

5. In a baggage carrier, a base plate secured to an automobile, a standard seated on said base plate, a ring flange on the end of said standard, a link mounted on said base plate, a flexible connection between said link and said ring flange, a link on said standard for tightening said flexible connection, oppositely disposed notches in said standard, and means for moving said last mentioned link on said standard and securing it in said notches.

6. In a baggage carrier, a base plate, a standard seated on said base plate, a ring flange in the top of said standard, a link in said base plate, a spacing bar having hooked ends adapted to engage said link and said ring flange; and means for securing said spacing bar in place.

7. In a baggage carrier, the combination of a pair of base plates secured to the running-board of an automobile, a standard on each of said base plates, spacing bars connecting the tops of said standards with said base plates, a compartment forming connection between said spacing bars, and means for holding said bars in place.

8. In a baggage carrier, the combination of a pair of base plates secured to the running-board of an automobile, a standard for each of said base plates, spacing bars connecting the tops of said standards with said base plates, boards connecting said spacing bars, and means for securing said bars in place.

9. In a baggage carrier, the combination of a base plate secured at the front and a base plate secured at the rear of the running-board of an automobile, a standard rising from each of said base plates, a ring flange in the end of each of said standards, a link in each of said base plates, bars having hooked ends engaging each link and ring flange, boards connecting said bars, and means for securing said bars in place.

10. In a baggage carrier, a frame in which to seat the baggage; straps to hold said baggage in said frame; clamping means adapted to slide over the frame and over a strap attached to the frame for drawing said strap tight around said baggage, and said clamping means being held in locked engagement with said frame by inclined notches on said frame.

11. In a baggage carrier, a frame; straps for holding baggage in said frame; buckles on the straps; auxiliary means adapted to slide over the frame and over a strap attached to the frame for taking up slack in said strap after buckling; and means adapted to hold said auxiliary means in locked engagement with said frame after the slack has been taken up.

In testimony whereof, I have hereunto set my hand at Los Angeles, California, this 9th day of April, 1919.

BENJAMIN HENRY CHRISTLIEB.

Witnesses:
M. BEULAH TOWNSEND,
WM. M. GENTLE.